W. H. HERMANN.
TIRE BUILDING MACHINE.
APPLICATION FILED APR. 26, 1915.
1,159,840.
Patented Nov. 9, 1915.
3 SHEETS—SHEET 2.
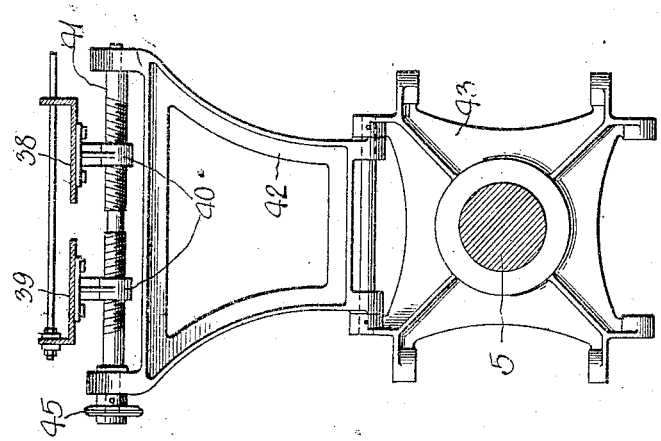
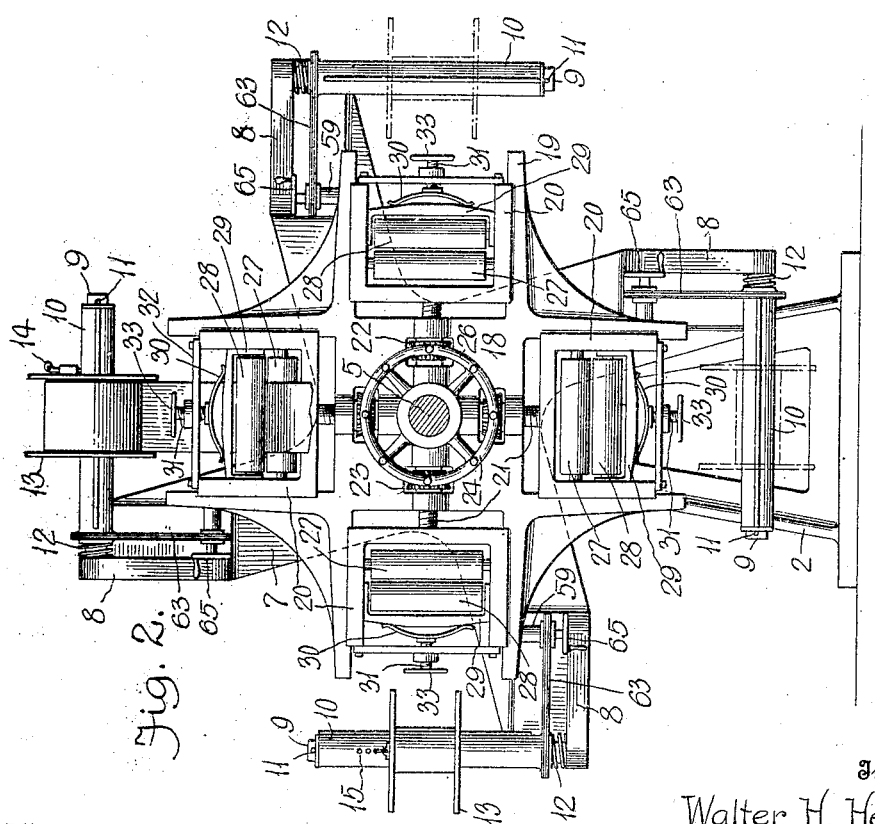
Witnesses
Chas. H. Stauffiger
Karl H. Butler
Inventor
Walter H. Hermann
By
Attorneys W. H. HERMANN.
TIRE BUILDING MACHINE.
APPLICATION FILED APR. 26, 1915.
1,159,840.
Patented Nov. 9, 1915.
3 SHEETS—SHEET 3.
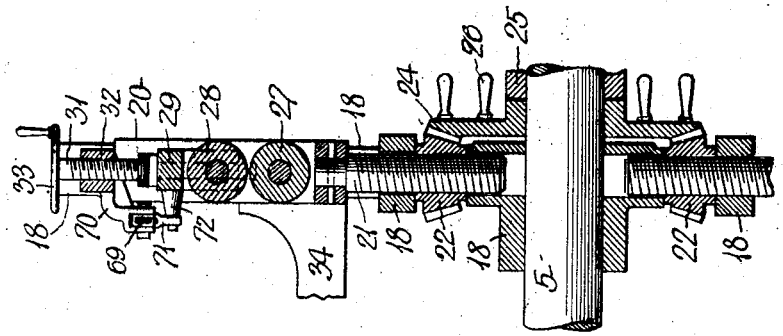
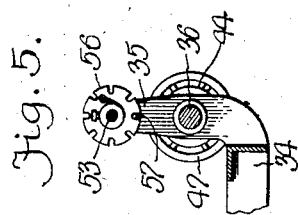
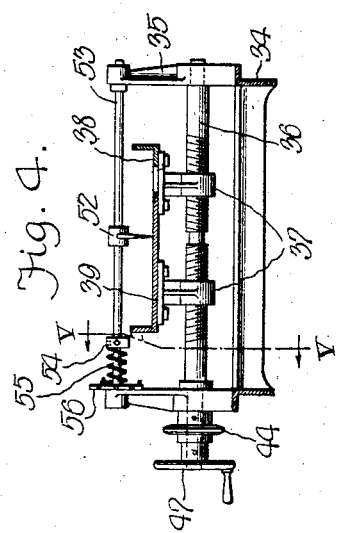
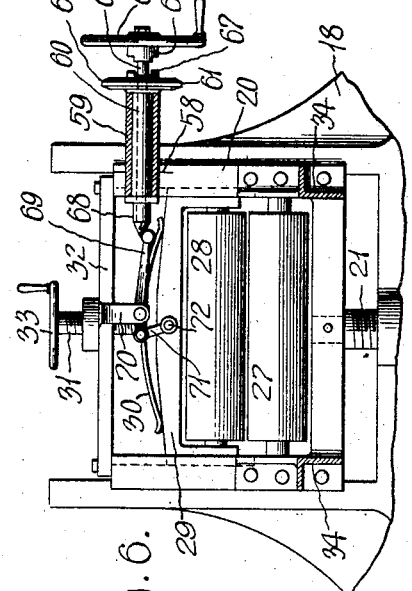
Witnesses
Chas. W. Stauffiger
Karl H. Butler
Inventor
Walter H. Hermann,
By Bartho? Ranthof
Attorneys

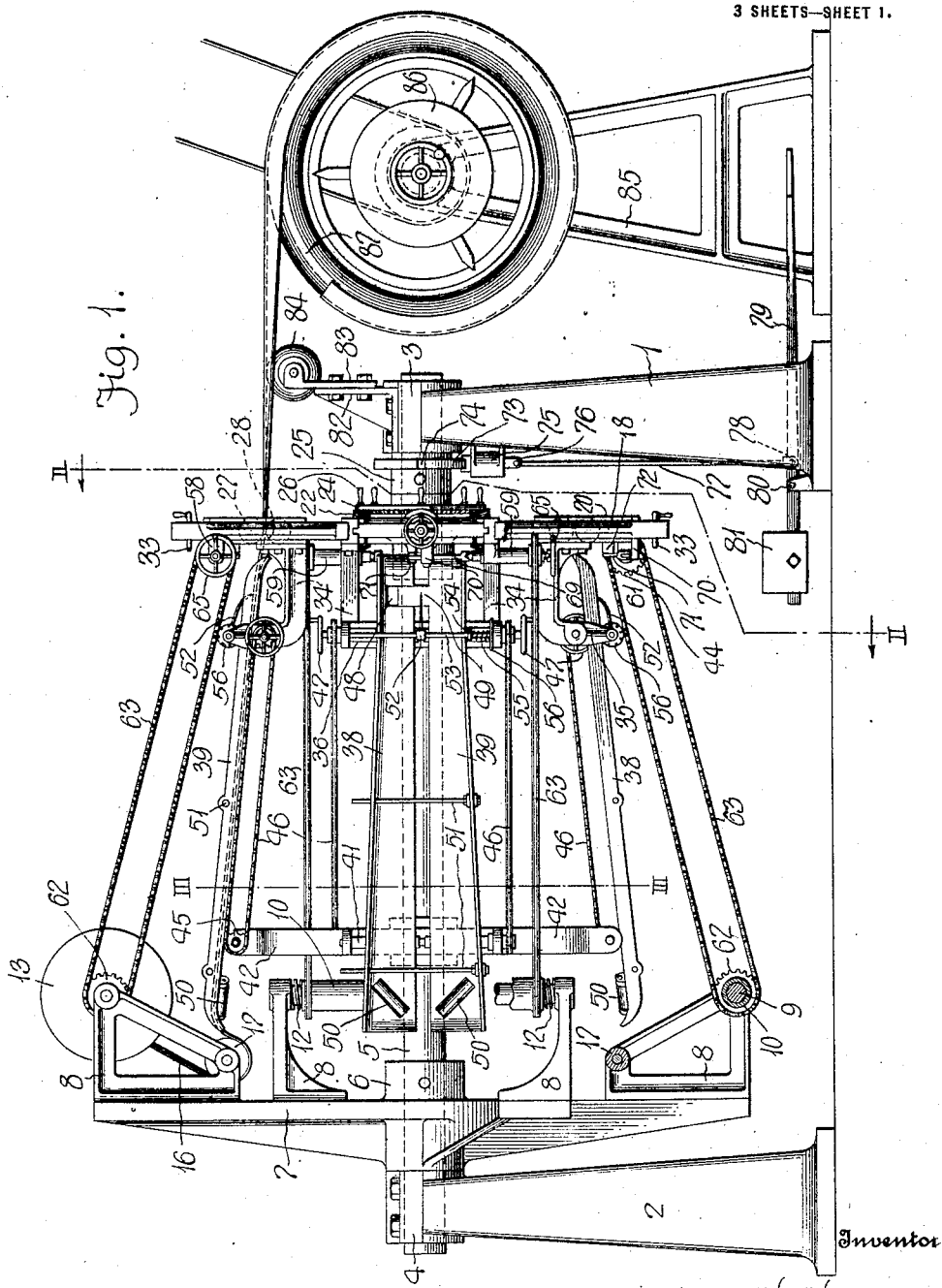

UNITED STATES PATENT OFFICE.

WALTER H. HERMANN, OF LANCASTER, OHIO.

TIRE-BUILDING MACHINE.

1,159,840.  Specification of Letters Patent.  Patented Nov. 9, 1915.

Application filed April 26, 1915. Serial No. 24,083.

*To all whom it may concern:*

Be it known that I, WALTER H. HERMANN, a citizen of the United States of America, residing at Lancaster, in the county of Fairfield and State of Ohio, have invented certain new and useful Improvements in Tire-Building Machines, of which the following is a specification, reference being had therein to the accompanying drawings.

This invention relates to a tire building machine, more especially designed for fabricating the outer tubes or open-bellied casings of pneumatic vehicle tires.

One of the objects of my invention is to expeditiously and economically fabricate an outer tube or tire casing with a proper degree of tension on the canvas or material entering into the construction of the tire, to insure close contact of superimposed layers of canvas or other material, and thus provide a homogeneous mass after the outer tube or tire casing is vulcanized.

Another object of this invention is to provide a machine wherein a positive and reliable means are employed, in a manner hereinafter set forth, for quickly applying laminations of skim-coated or rubber saturated canvas to a core or form, the means including novel adjustable guides that correctly center the canvas relative to a core or form, irrespective of the position or location of the stock rolls of canvas or the manner in which the canvas is wound upon the rolls.

A further object of this invention is to provide a device for marking canvas or other material preparatory to mounting on a core or form, thereby facilitating an accurate application and obviating cutting, trimming, and the marking of a canvas on a stock roll.

A further object of this invention is to provide a machine which affords novel means for applying a tread or peripheral cover to a circular or wheel like body, and the removal of the imperfectly applied material.

A still further object of this invention is to provide a tire building machine wherein the parts are constructed with a view of reducing the cost of manufacture and at the same time retain the features by which safety, durability, simplicity and ease of assembling are secured, and with such ends in view the invention resides in the novel construction to be hereinafter specifically described and then claimed.

Reference will now be had to the drawings, wherein—

Figure 1 is a side elevation of a tire building machine in accordance with this invention; Fig. 2 is a cross sectional view of the same taken on the line II—II of Fig. 1; Fig. 3 is a similar view taken on or about line III—III of Fig. 1; illustrating a portion of the machine; Fig. 4 is a cross sectional view of a portion of the machine illustrating an adjustable guide and marking device; Fig. 5 is a longitudinal sectional view of the same taken on the line V—V of Fig. 4; Fig. 6 is an enlarged front elevation of one of the tension devices; and Fig. 7 is an enlarged longitudinal sectional view of a portion of the machine, illustrating in section the tension device shown in Fig. 6.

In describing my invention by aid of the views above referred to, I desire to point out that the same are intended as merely illustrative of an example whereby my invention may be applied in practice, and I do not care to limit my invention to the precise construction and arrangement of parts shown. The following description is therefore to be broadly construed as including substitute constructions and arrangement of parts which are the obvious equivalent of those to be hereinafter referred to.

In the drawings, 1 and 2 denote A-frames or pedestals having bearings 3 and 4 respectively for a revoluble shaft 5.

6 denotes a stock holder suitably secured to the shaft 5 contiguous to the frame or pedestal 2. The stock holder 6 is in the form of a spider or radiating arms 7, each arm having an edge thereof radial relative to the shaft 5 and another edge tangential relative to said shaft, thus placing the outer ends of the arms 7 in a plane at one side or the other of the vertical axis of the machine, when the rotary stock holder is held stationary.

8 denotes forwardly projecting triangular shaped brackets carried by the outer ends of the arms 7 and each bracket has a fixed spindle 9. Considering the rotary stock holder as being held stationary, the spindles 9 are disposed at right angles to the vertical and horizontal axes of the machine and on these spindles are revoluble sleeves held against longitudinal displacement by pins 11 and coiled compression springs 12. The springs 12 encircle the spindle 9, between the sleeve brackets 8 and the inner ends of the sleeve 10, to hold the outer ends of the sleeve against the pins 11.

Adjustable longitudinally of the sleeves 10 and adapted to rotate therewith are stock rolls or bobbins 13 which are adjustably held relative to the sleeves 10 by pins 14 engaging in a series of openings 15 provided therefor in the sleeves, said pins constituting suitable hold-fast devices for the stock rolls or bobbins. Wound upon the stock rolls or bobbins 13 are strips of tire building material 16, as skim-coated or rubber saturated canvas.

To prevent the convolutions of canvas from sticking together strips of plain muslin or the like are wound upon the stock rolls simultaneous with the canvas and to separate these two strips whereby the canvas can be used for building a tire and the muslin again used, the brackets 8 are provided with take-up rolls or bobbins 17 under which the strips of canvas extend and have the strips of muslin attached thereto, whereby the strips of muslin will be wound upon the take-up rolls or bobbins and liberate the strips of canvas.

18 denotes a tension head mounted upon the shaft 5 adjacent to the A-frame or pedestal 1. The head 18 has sets of radiating guides 19 for roller housings 20, and these housings are simultaneously adjusted in the sets of guides 19 by the screws 21 connected to the housing and in screwthreaded engagement with the head 18, said screws having the inner ends thereof provided with beveled gear wheels 22 located in openings 23 provided therefor in the head 18. The beveled gear wheels 22 mesh with a circular rack or toothed wheel 24 loose upon the shaft 5 and retained in engagement with the beveled gear wheels 22 by a collar 25 secured to the shaft 5. The circular rack 24 has a plurality of handles or hand grips 26 whereby said rack can be easily revolved upon the shaft 5 to radially adjust the roller housings 20.

27 denotes rolls having the spindles thereof journaled in the housing 20 and associated with said rolls are revoluble rolls 28 having the spindles thereof journaled in stirrups 29 slidable in the housings 20. The stirrups 29 are engaged by flat compression springs 30 loosely connected to the inner ends of screws 31 adjustable in cross heads 32, carried by the housings 20. The outer ends of the screws 31 are provided with hand wheels 33 whereby the tension of the springs 30 can be increased or decreased to obtain a desired pressure of said springs upon the stirrups 29.

34 denotes a rearwardly projecting bracket carried by each roll housing 20 and each bracket is provided with a set of transversely alining bearings 35 for a revoluble screw 36 having left and right hand screw threads. In threaded engagement with the screw 36 are depending nuts 37 carried by the sections 38 and 39 of a tapering channel guide disposed longitudinally of the machine. The channel guides correspond in number to the stock rolls or bobbins 13 and the rear ends of said channel guides have the sections 38 and 39 thereof provided with depending nuts 40 in screwthreaded engagement with revoluble screws 41, carried by frames 42 connected to a head 43 mounted upon the shaft 5, contiguous to the rotary stock holder. Since the forward ends of the channel guides are supported from the housings 20, which are adjustable, it is necessary to pivotally connect the frames 42 to the head 43, as clearly shown in Fig. 3.

44 and 45 denotes sprocket wheels on the screws 36 and 41 respectively, and trained over said sprocket wheels are sprocket chains 46. The screws 36 have hand wheels 47 and by revolving these hand wheels, the screws 36 and 41 can be revolved in synchronism to adjust the sections 38 and 39 of the channel guides, at both ends thereof. The sections 38 of the tapering channel guides have slots 48 to receive tongues 49 of the sections 39, said tongues and slots being located at the forward ends of the guides, while the rear ends thereof are provided with converging rollers 50. Bracing the sections 38 and 39 of the tapering channel guide are rods 51, carried by the wall or flange of the section 39 and extending through the wall or flange of the section 38.

52 denotes a yieldable marking device mounted centrally of a rod 53 journaled in the bearings 35 of each bracket 34. Mounted upon the rod 53, adjacent to one end thereof, is a collar 54 and attached to said collar is an end convolution of a spiral compression spring 55, which encircles the rod 53. The other end convolution of the spring 55 is connected to a take-up member 56 having the periphery thereof notched to receive a pin 57, carried by the bearing 35. The take-up member 56 is loose upon the rod 53 and can be shifted longitudinally thereof in order that it can be moved in and out of engagement with the pin 57, thus permitting of the spring 55 being wound or unwound to regulate the tension thereof. It is through the medium of the spring 55 that the marking device 52 constantly bears upon the strip of canvas 16 which passes over the channel guides and beneath the marking device.

58 denotes a rearwardly projecting bracket carried by one side of each of the roller housings 20 and best shown in Figs. 1 and 6. The brackets 58 are provided with tubular transversely disposed bearings 59 and journaled in said bearings are the tubular hubs 60 of sprocket wheels 61. These sprocket wheels longitudinally aline with sprocket wheels 62 on the inner ends of the sleeves 10 of the rotary stock holder, and trained over said sprocket wheels are endless sprocket chains 63. Slidable in the tubular hubs 60 of the sprocket wheels 61 are plungers 64 which have the outer ends thereof provided with hand wheels 65 and clutch members 66, said members being adapted to mesh with clutch members 67 forming part of the sprocket wheels 61. By pushing inwardly upon the plungers 64, said plungers can be rotated to impart a similar movement to the sprocket wheels 61 and thereby revolve the sleeves 10 upon the spindles 9 of the rotary stock holder. The mechanism just described constitutes means for rewinding a strip of canvas upon a stock roll, and when such operation is necessary, it is desirable to release the tension upon the strip of canvas to be drawn or returned to its stock roll. To accomplish this the inner ends of the plungers 64 are provided with tapering heads 68 to engage fulcrumed levers 69 supported by brackets 70 forming part of the cross heads 32. The short arms of the fulcrum levers 69 are connected by links 71 to projections 72 of the stirrups 29.

73 denotes a peripheral flange of the collar 25 and said flange is provided with notches 74 corresponding in number to the stock rolls of the rotary stock holder. Beneath the flange 73 is a guide 75 carried by the A-frame or pedestal 1 and in said guide is a slidable latch or detent 76 carried by the upper end of the rod 77. This rod has the lower end thereof pivotally connected, as at 78 to a treadle 79 fulcrumed in a bearing 80 carried by the base of the frame or pedestal 1. The rear end of the treadle 79 has a counterbalance or weight 81 adapted to retain the rod 77 elevated and the latch or detent thereof normally in engagement with the flange 73 and in one of the notches 74 thereof, whereby the rotary stock holder will be normally held with one of the stock rolls and its associated instrumentality in position for use.

82 denotes an upright mounted upon the A-frame or pedestal 1 and adjustably connected to said upright is a bearing 83 containing a revoluble roller 84, said roller being ovate in longitudinal section and the upper side thereof in a horizontal plane with the pass between the rolls 27 and 28.

85 denotes a suitable support for a revoluble chuck or core holder 86 adapted to firmly hold a core or form 87 which for the purposes of building a tire casing, is circular or wheel shaped, the core or form having a periphery corresponding in circumference and a cross section corresponding in area to a desired size of tire casing. The core or form 87 is disposed in the vertical plane of the longitudinal axes of the machine and the top of the core or form is in a plane horizontal with the top of the roller 84 and the pass of the tension rolls 27 and 28.

By reference to Fig. 2, of the drawing, it will be observed that the rotary stock holder has provision for a plurality of stock rolls or bobbins that may differ in size, consequently the desired variety of materials of various widths are conveniently held for immediate use.

Since the multiple stock holder is revoluble between the A-frames or pedestals 1 and 2, pressure upon the outer end of the treadle 79 releases the stock holder, whereby it can be manually revolved to place a desired stock roll in its operative position.

After suitable stock has been placed upon the holder, the rolls of canvas are unwound and the ends of the strips of muslin attached to the take-up rolls 17. With the strips of canvas passing under the take up rolls 17 and along the tapering channel guides, the take up rolls are caused to revolve and wind the muslin thereon. The ends of the strips of canvas are carried between the tension rolls 27 and 28 and with these rolls properly adjusted the ends of the strips of canvas are held whereby they can be easily gripped and pulled forward over the roller 84 for attachment to the core or form 87. Through the medium of the tapering guides and the rollers 50 thereof the canvas is properly centered to pass between the tension rolls 27 and 28 irrespective of any imperfect winding of the canvas upon the stock rolls.

After an end of a strip of canvas has been connected to the core or form and the core or form set in motion, the strip of canvas is properly positioned upon the core and since the strip is provided with a center line or mark, it is an extremely easy matter for an operator or attendant of the machine to locate wrappings upon the core, whereby the same will be uniform throughout.

After the core 87 has made one revolution, the strip of canvas is severed and the ends of the canvas on the core overlapped. Then the core is again revolved to present a new point of attachment for another wrapping which is laid upon the first wrapper, and this operation is continued with strips of canvas of various widths until a laminated casing is built upon the core.

In view of the novel means employed for accurately centering strips of canvas or other material entering into the make up of a casing, it is almost impossible for an operator or attendant of the machine to incorrectly fabricate the tire casing and by eliminating caution when winding stock rolls, cutting and trimming of the edges of the canvas after its installation and the exercise of skill heretofore required by workmen, considerable time and labor are saved. However, should a mistake occur, such as placing the wrong width of canvas upon the core, the canvas can be unwound from the core by operating the hand wheel 65 which is in operative position. The tension of the roll 28 upon the strip of canvas is released in advance of restoring portions of the strip of canvas to the stock roll, consequently the unwrapping or removal of a wrapper from the core can be quickly performed.

After the installation of a stock roll and prior to placing the end of the strip of canvas between the tension rolls, the tapering guide is adjusted whereby the sections thereof will properly feed the strip of fabric to the pass between the tension rolls, and irrespective of the position of a roll the guide associated therewith is maintained in position to correctly guide the canvas to the tension rolls. Any suitable means can be employed, as a motor, for imparting movement to the core or form 87, and in some instances the roller 84 can be dispensed with, particularly when the core is located in close proximity to the tension roll.

What I claim is:—

1. A tire building machine comprising a rotary multiple stock holder adapted to hold rolls of material, a head movable in synchronism therewith, a plurality of adjustable tension rolls carried by said head and between which material is adapted to pass to a suitable form, and means adjustable with the tension rolls adapted to guide material from the rolls of said holder to the rolls of said head.

2. A tire building machine comprising a rotary multiple stock holder adapted to hold rolls of material, a head movable in synchronism therewith, a plurality of adjustable tension rolls carried by said head and between which material is adapted to pass to a suitable form, means adjustable with the tension rolls adapted to guide material from the rolls of said holder to the rolls of the last said head, and means carried by the last said head, and means carried by the last said head mentioned means adapted to mark material prior to passing between said tension rolls.

3. A tire building machine comprising a rotary multiple stock holder adapted to hold rolls, each having strips of material wound thereon, a take-up roll adjacent each stock roll and adapted to receive a strip of material from said roll, an adjustable guide in the same plane as said stock and take-up roll adapted to receive and guide the other strip of material from said stock roll, and means carried by said guide for marking the strip of material passing therethrough.

4. In a tire building machine, a stock holder, a tension head adapted to regulate the withdrawal of stock from said holder, a stock guide between said holder and said head, and means on said head adapted to mark stock as withdrawn from said holder.

5. A tire building machine comprising a stock holder adapted to hold a roll having strips of material wound thereon, a take-up roll adjacent said stock roll and adapted to receive a strip of material from said stock roll, adjustable tension rolls in a plane with said stock and take-up rolls and between which the other strip of material is adapted to pass to a suitable core, and adjustable guides between said take-up rolls and said tension rolls and over which the strip of material is adapted to pass to said tension rolls.

6. A tire building machine comprising a stock holder adapted to hold a roll having strips of material wound thereon, a take-up roll adjacent said stock roll and adapted to receive a strip of material from said stock roll, tension rolls in a plane with said stock and take-up rolls and between which the other strip of material is adapted to pass, an adjustable guide between said take-up rolls and said tension rolls and over which the strip of material is adapted to pass to said rolls, and means carried by said guide adapted to mark the strip of material prior to passing between said tension rolls.

7. In a tire building machine, a rotary multiple stock holder adapted to hold rolls, having strips of material wound thereon, a take-up roll adjacent each stock roll and adapted to receive a strip of material from said roll, an adjustable guide in the same plane as said stock and take-up rolls adapted to receive and guide the other strip of material, and means associated with said stock rolls adapted to facilitate rewinding the strips of material thereon.

8. In a tire building machine, a stock holder adapted to hold a roll having strips of material wound thereon, a take-up roll adjacent said stock roll and adapted to receive a strip of material from said stock roll, tension rolls in a plane with said stock roll and take-up roll and between which the other strip of material is adapted to pass, and means between said stock roll and said tension rolls adapted to facilitate rewinding the strips of material on said stock roll.

9. In a tire building machine, the combination with a core of sets of stock holding and feeding rolls, each set comprising a stock roll of two strips of material, a take-up roll for one strip of material, a set of tension rolls between which the other strip of material is adapted to pass, means between the stock roll and the tension rolls of each set adapted to facilitate rewinding the strips of material on said stock roll, the sets of rolls being articulated whereby each set can be shifted into a plane with said core to facilitate placing the material thereon.

10. In a tire building machine, the combination with a core of sets of stock holding and feeding rolls, each set comprising a stock roll of two strips of material, a take-up roll for one strip of material, a set of tension rolls between which the other strip of material is adapted to pass, an adjustable guide between said take-up roll and said tension rolls and over which the strip of material is adapted to pass to said tension rolls, means between the stock roll and tension rolls of each set adapted to facilitate rewinding the strips of material upon said stock roll, and means articulating the rolls of each set whereby either set can be shifted into the plane of said core to facilitate placing material thereon.

11. In a tire building machine, the combination with a core, of sets of stock holding and feeding rolls, each set comprising a stock roll of material, a set of tension rolls between which the strip of material is adapted to pass, and means between the stock roll and the tension rolls of each set adapted to facilitate rewinding the strip of material upon said stock roll, said sets of rolls being articulated whereby either set can be shifted into the plane of said core to facilitate placing material thereon.

12. The combination with a core, of sets of stock holding and feeding rolls, each set comprising a stock roll of material, a set of tension rolls between which the strip of material is adapted to pass, an adjustable guide between said stock roll and said tension rolls and over which the strip of material is adapted to pass to said tension rolls, means between the stock roll and tension rolls of each set adapted to facilitate rewinding of the strip of material upon said stock roll, and means articulating the sets of rolls whereby either set can be shifted into the plane of said core to facilitate placing a strip of material thereon.

13. A tire building machine, the combination with a core, of sets of stock holding and feeding rolls, each set comprising a stock roll of material, a set of tension rolls between which the material is adapted to pass, an adjustable guide between said stock roll and said tension rolls and over which the material is adapted to pass to said tension rolls, means between the stock roll and tension rolls of each set for rewinding the material upon said stock roll, means articulating the sets of rolls whereby either set can be shifted into an operative position relative to said core, and means adapted to lock a set of stock holding and feeding rolls in an operative position.

In testimony whereof I affix my signature in presence of two witnesses.

WALTER H. HERMANN

Witnesses:
 ANNA M. DORR,
 KARL H. BUTLER.